United States Patent
Rosemann (10) Patent No.: US 10,423,375 B2
(45) Date of Patent: Sep. 24, 2019

(54) NON-TRANSITORY COMPUTER-READABLE STORAGE MEDIUM, CLIENT COMPUTER, AND PRINT METHOD

(71) Applicant: Canon Europa N.V., Amstelveen (NL)

(72) Inventor: Michael Rosemann, Wallenhorst (DE)

(73) Assignee: Canon Europa N.V., Amstelveen (NL)

( * ) Notice: Subject to any disclaimer, the term of this patent is extended or adjusted under 35 U.S.C. 154(b) by 0 days.

(21) Appl. No.: 15/969,542

(22) Filed: May 2, 2018

(65) Prior Publication Data

US 2018/0321888 A1 Nov. 8, 2018

(30) Foreign Application Priority Data

May 5, 2017 (GB) .................................... 1707218.2

(51) Int. Cl.
*G06F 3/12* (2006.01)
(52) U.S. Cl.
CPC ............ *G06F 3/1259* (2013.01); *G06F 3/121* (2013.01); *G06F 3/1207* (2013.01); *G06F 3/1248* (2013.01); *G06F 3/1261* (2013.01); *G06F 3/1288* (2013.01); *G06F 3/1298* (2013.01); *G06F 3/122* (2013.01)
(58) Field of Classification Search
USPC ....................................................... 358/1.15
See application file for complete search history.

(56) References Cited

U.S. PATENT DOCUMENTS

| | | | | |
|---|---|---|---|---|
| 5,692,111 | A | * | 11/1997 | Marbry ................. G06F 3/1297 358/1.15 |
| 5,819,020 | A | * | 10/1998 | Beeler, Jr. ........... G06F 11/2071 714/5.11 |
| 6,288,790 | B1 | * | 9/2001 | Yellepeddy ........... G06F 3/1204 358/1.13 |
| 2001/0047348 | A1 | * | 11/2001 | Davis ...................... G06F 16/40 |
| 2002/0186407 | A1 | | 12/2002 | Laughlin |
| 2003/0076522 | A1 | | 4/2003 | Simpson et al. |

(Continued)

FOREIGN PATENT DOCUMENTS

EP 1548569 A2 6/2005
WO 0054138 A1 9/2000

OTHER PUBLICATIONS

Microsoft, Introduction to Printing; Apr. 19, 2017, Web Site, https://docs.microsoft.com/en-us/windows-hardware/drivers/print/introduction-to-printing, All Pages (Year: 2017).*

*Primary Examiner* — Marcellus J Augustin
(74) *Attorney, Agent, or Firm* — Canon U.S.A., Inc. IP Division (57) ABSTRACT

A printer driver maintains a list of print servers that a client computer can use to send a print job to a printer, and renders the print job into a page description language. A print processor creates a first print queue for sending the rendered print job to a first print server and adds the rendered print job to the created first print queue, and monitors sending of the rendered print job in the first print queue. If the sending of the rendered print job from the client computer to the first print server is not successful, the print processor creates a second print queue and adds a duplicate print job to the second print queue by duplicating the rendered print job in the first print queue, the printer driver sends the duplicate print job in the second print queue to a second print server.

9 Claims, 9 Drawing Sheets

(56) References Cited

U.S. PATENT DOCUMENTS

| | | | |
|---|---|---|---|
| 2003/0128384 A1* | 7/2003 | Nelson | G06F 3/1217 358/1.15 |
| 2005/0141007 A1* | 6/2005 | Shirai | G06F 3/0486 358/1.13 |
| 2008/0030770 A1* | 2/2008 | Nishioka | G06F 3/1217 358/1.15 |
| 2008/0040717 A1* | 2/2008 | Hobson | G06Q 10/00 718/101 |

* cited by examiner

NON-TRANSITORY COMPUTER-READABLE STORAGE MEDIUM, CLIENT COMPUTER, AND PRINT METHOD

CROSS-REFERENCE TO RELATED APPLICATION

The present patent application claims the benefit under 35 U.S.C. § 119(a)-(d) of United Kingdom Patent Application No. GB1707218.2, filed on May 5, 2017 and entitled "RESILIENT PRINT JOB SUBMISSION".

The content of GB1707218.2 is incorporated herein by reference in its entirety.

TECHNICAL FIELD

The present invention relates to the issuing of printing instructions by a client computer that is connected to a plurality of print servers.

BACKGROUND

Printing systems include a client computer that is arranged to send print instructions to a print server. The client installs software that is required to send print jobs to the print server, such as a printer driver and a print processor. This software can be installed by the user providing the client with installation media. Alternatively, this software can be installed by being sent to the client by the print server using, for example, technology such as Point and Print from Microsoft (registered trademark).

Print jobs are stored in a print queue by the memory of the client to be sent to the print server. Once a print job has been transferred successfully, the print queue is updated to remove the print job. However, if the print server fails, the client waits until the print server becomes available. When the client can communicate with the print server, the print job is sent to the print server.

Waiting for the print server to become available places a burden on the client to store the print jobs in the print queue, and then transmit the print jobs once the print server is back online. A large number of print jobs can accumulate in the print queue while the print server is offline, and so when these print jobs are eventually transmitted, a burden is placed on the printer. Furthermore, it is urgent to fix the print server, because its failure causes a delay in printing of print jobs that are stored in the print queue. Consequently, there is a demand for a way of printing a print job even while the print server has failed, without the need to wait for the print server to come back online.

Accordingly, it would be useful to reduce the time and resources required for installing software on the client that is used to provide instructions to a further print server. There is a demand for a print system which is resilient during print job submission so that in the event of the failure of a print server, that print instructions can be issued to a replacement print server, without the need to reconfigure the installation of the client.

SUMMARY

Aspects of the present invention are set out by the independent claims.

According to a first aspect there is provided a non-transitory computer-readable storage medium storing a software package comprising a printer driver and a print processor. The printer driver is configured, when installed on a client computer: to maintain a list of print servers that the client computer can use to send a print job to a printer; and to render the print job into a page description language. The print processor is configured: to create a first print queue for sending the rendered print job from the client computer to a first print server and to add the rendered print job to the created first print queue; and to monitor sending of the rendered print job in the first print queue. If the sending of the rendered print job from the client computer to the first print server is not successful: the print processor is configured to create a second print queue and to add a duplicate print job to the second print queue by duplicating the rendered print job in the first print queue; the printer driver is configured to select a second print server from the list of print servers maintained by the printer driver; and the printer driver is configured to send the duplicate print job in the second print queue from the client computer to the second print server.

Optionally, if the sending of the duplicate print job from the client computer to the second print server is not successful, the printer driver is configured to select a third print server from the list of print servers maintained by the printer driver, and the printer driver is configured to send the duplicate print job in the second print queue from the client computer to the third print server.

Optionally, the print processor is configured, if the sending of the rendered print job from the client computer to the first print server is successful, to update the first print queue by removing the rendered print job, when a confirmation notification is received.

Optionally, the print processor is configured, if the sending of the rendered print job from the client computer to the first print server is not successful: to update the first print queue by removing the rendered print job when creating the second print queue; and to update the second print queue by removing the duplicate print job when creating the second print queue, when a confirmation notification is received.

Optionally, the printer driver is configured to maintain the list of print servers by receiving data on the print servers that are available to the client computer from at least one of the print servers.

According to a second aspect there is provided a client computer comprising a non-transitory computer-readable storage medium storing a software package according to the first aspect, the software package comprising a printer driver and a print processor. The printer driver is configured, when installed on a client computer: to maintain a list of print servers that the client computer can use to send a print job to a printer; and to render the print job into a page description language. The print processor is configured: to create a first print queue for sending the rendered print job from the client computer to a first print server and to add the rendered print job to the created first print queue; and to monitor sending of the rendered print job in the first print queue. If the sending of the rendered print job from the client computer to the first print server is not successful: the print processor is configured to create a second print queue and to add a duplicate print job to the second print queue by duplicating the rendered print job in the first print queue; the printer driver is configured to select a second print server from the list of print servers maintained by the printer driver; and the printer driver is configured to send the duplicate print job in the second print queue from the client computer to the second print server.

Optionally, the client computer is configured to automatically retrieve the software package from the first print server.

Optionally, the automatic retrieval of the software package is performed using point and print.

Optionally, there is provided a print system comprising the client computer and a plurality of print servers.

According to a third aspect there is provided a print method for providing resilient transmission of a print job from a client computer to a print server, the print method comprising: installing a printer driver and a print processor on a client computer: the printer driver maintaining a list of print servers that the client computer can use to send a print job to a printer; the printer driver rendering the print job into a page description language; and the print processor creating a first print queue for sending the rendered print job from the client computer to a first print server and adding the rendered print job to the created first print queue; and the print processor monitoring the sending of the rendered print job in the first print queue; wherein if the sending of the rendered print job from the client computer to the first print server is not successful: the print processor creating a second print queue and adding a duplicate print job to the second print queue by duplicating the rendered print job in the first print queue; the printer driver selecting a second print server from the list of print servers maintained by the printer driver; and the printer driver sending the duplicate print job in the second print queue from the client computer to the second print server.

BRIEF DESCRIPTION OF THE DRAWINGS

Embodiments will now be described, by way of example only, with reference to the accompanying drawings, in which.

DETAILED DESCRIPTION

Figure 1:
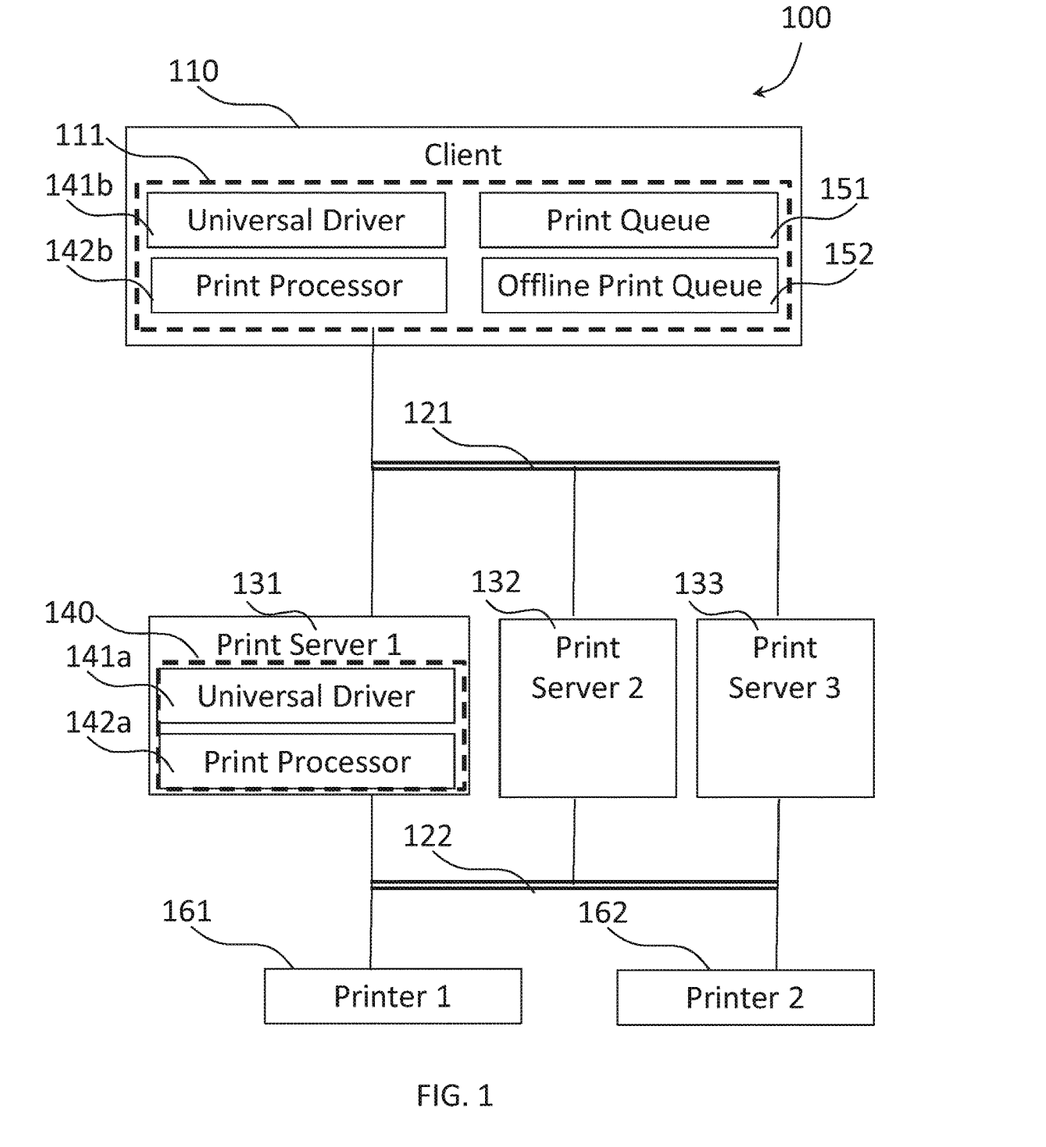
FIG. 1 is a schematic of a printing system comprising a client computer connected to a plurality of print servers, which are connected to a plurality of printers.

FIG. 1 shows a printing system 100. A client computer 110 is connected to a plurality of print servers 131-133 via a first network 121. The plurality of print servers 131-133 are connected to a plurality of printers 161-162 via a second network 122. The first network 121 and second network 122 may be parts of the same network. Transmission of information over the networks 121-122 can be performed, for example, using wired connections such as Ethernet, or wireless local area networking (WLAN) such as Wi-Fi (registered trademark).

In the present embodiment, the client 110 is a laptop or personal computer running Microsoft Windows (registered trademark) operating system. However, in other embodiments, different hardware and/or operating systems may be used. Thus, the client computer 110 is referred to as a client.

The first print server 131 comprises a memory 140 which stores data and software. The memory 140 of the first print server 131 includes a universal printer driver 141a and a print processor 142a that can be downloaded by the client 110 using 'Point and Print' processes managed by the Windows operating system. When using 'Point and Print' the operating system causes the client to copy an entire driver package (including the universal printer driver and print processer) to the client and install the printer driver. By virtue of this 'Point and Print' process all runnable components of the driver are installed on the client and driver signing and integrity are checked by the operating system on the client.

The universal printer driver is a printer driver that prints into a PDL (page description language) that can be understood by the print servers 131-133. The print server 131 (or other print server) receives the print job from the universal printer driver and is configured to convert the print job into a suitable print job format for printing by the selected printer 161-162.

The printing system 100 is configured to perform client-side rendering which causes the universal printer driver 141b to render the print job to the Page Description Language (PDL) that the printer uses instead of other formats that the universal printer driver natively uses.

Although not shown, the client 110 has a client-side spooler that co-operates with a server-side spooler installed on the first print server 131 to transfer print job data between the client 110 and first print server 131.

The print processor 142b is a piece of software that is used to monitor print jobs in the client-side Windows Spooler. It works together with the universal printer driver 141b to move the spooled print jobs from the hard disk drive 222 to the printer 161-162.

For the situation in which there is a plurality of print servers 131-133, universal printer driver 141a allows the client 110 to communicate with any of the print servers 131-133. The second print server 132 and the third print server 133 also have a memory which stores a copy of the universal printer driver and a print processor to allow clients that are connected to those servers to install those software components, although the client 110 has downloaded the universal printer driver 141b from the memory 140 of the first print server 131 and it is not necessary for the client 110 to install new software. If the client 110 is to submit a print job to the second print server 132 or the third print server 133, then the print job can be submitted without the need to download additional software.

The client 110 also comprises a memory 111, onto which is stored copies of the universal printer driver 141b and the print processor 142b, which have been obtained from the first print server 131 in accordance with the 'Point and Print' process described above. Once the universal printer driver 141b and the print processor 142b are installed on the client 110, it is possible for the client 110 to submit a print job to any of the print servers 131-133. An example of the type of print processor 142b is the APJ Print Processor, which is used to monitor print jobs in a print spooler, provided by NT-ware Systemprogrammierung GmbH (registered trademark). An APJ print processor embodying the invention was not available to the public at the relevant earliest date of this disclosure.

The client 110 also stores, in the memory 111, information that is used to implement print jobs, including a print queue 151 and an offline print queue 152. The term "first print queue" is used to refer to the print queue 151. The term "second print queue" is used to refer to the offline print queue 152.

The term "rendered print job" refers to a print job in the first print queue 151, that has been rendered into a page description language, by the printer driver 141b of the client 110. The term "duplicate print job" refers to a print job in the second print queue 152, that has been duplicated from the first print queue 151, by the print processor 142b of the client 110.

Figure 2A:
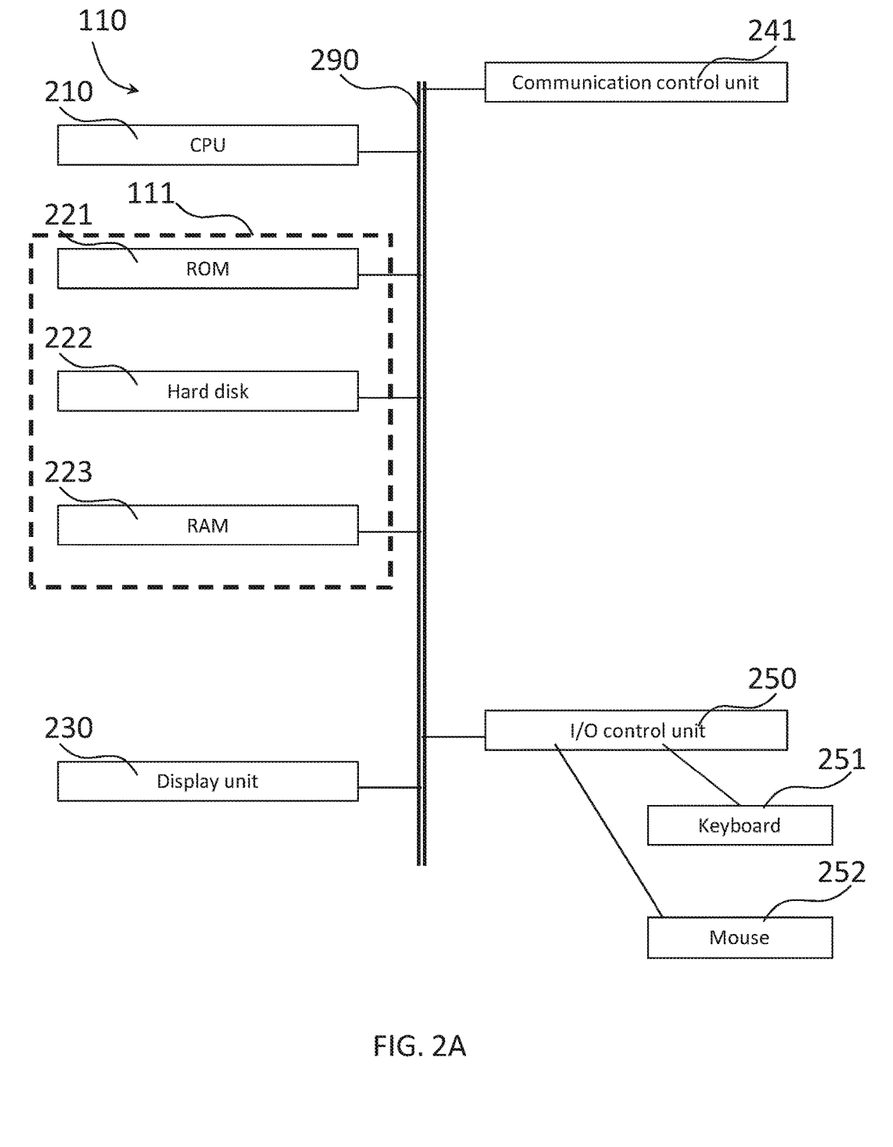
FIGS. 2A-2C are schematic diagrams illustrating hardware components of a client computer, a print server, and a printer.

FIG. 2A shows the hardware configuration of the client 110. The client 110 comprises a CPU 210, a memory 111, a display unit 230, a communication control unit 241, and an I/O control unit 250.

The memory 111 includes a read-only memory (ROM) 221, a hard disk drive 222, and a random-access memory (RAM) 223. The display unit 230 includes a monitor that is used to present information to the user. The communication control unit 241 allows the client 110 to communicate over the local area network (LAN) with the print servers 131-133. The I/O control unit 250 is connected to a keyboard 251 and a mouse 252, which the user can use to provide the client 110 with instructions. These components are standard hardware components for computers and other devices and perform their usual functions. These components are interconnected via a system bus 290.

Figure 2B:
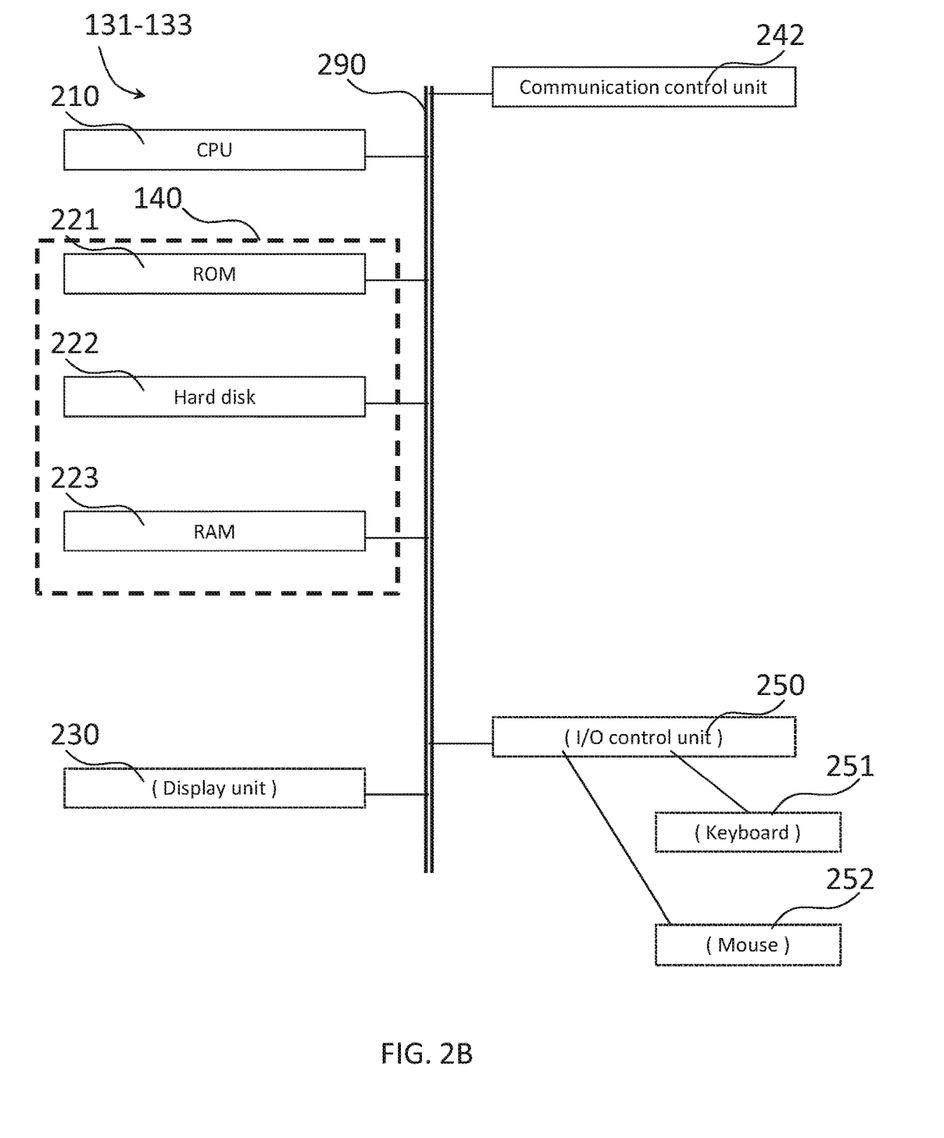

FIG. 2B shows the hardware configuration of the print server 131-133. The print server 131-133 includes features that perform substantially the same functions as the features of the client 110, as indicated by the corresponding reference numerals.

The communication control unit 242 allows the print server 131 to communicate over the LAN with the client 110 and the printers 161-162. It is not necessary for the print server 131 to include the display unit 230 or the I/O control unit 250, because the client 110 includes these features, but these features may be included.

Figure 2C:
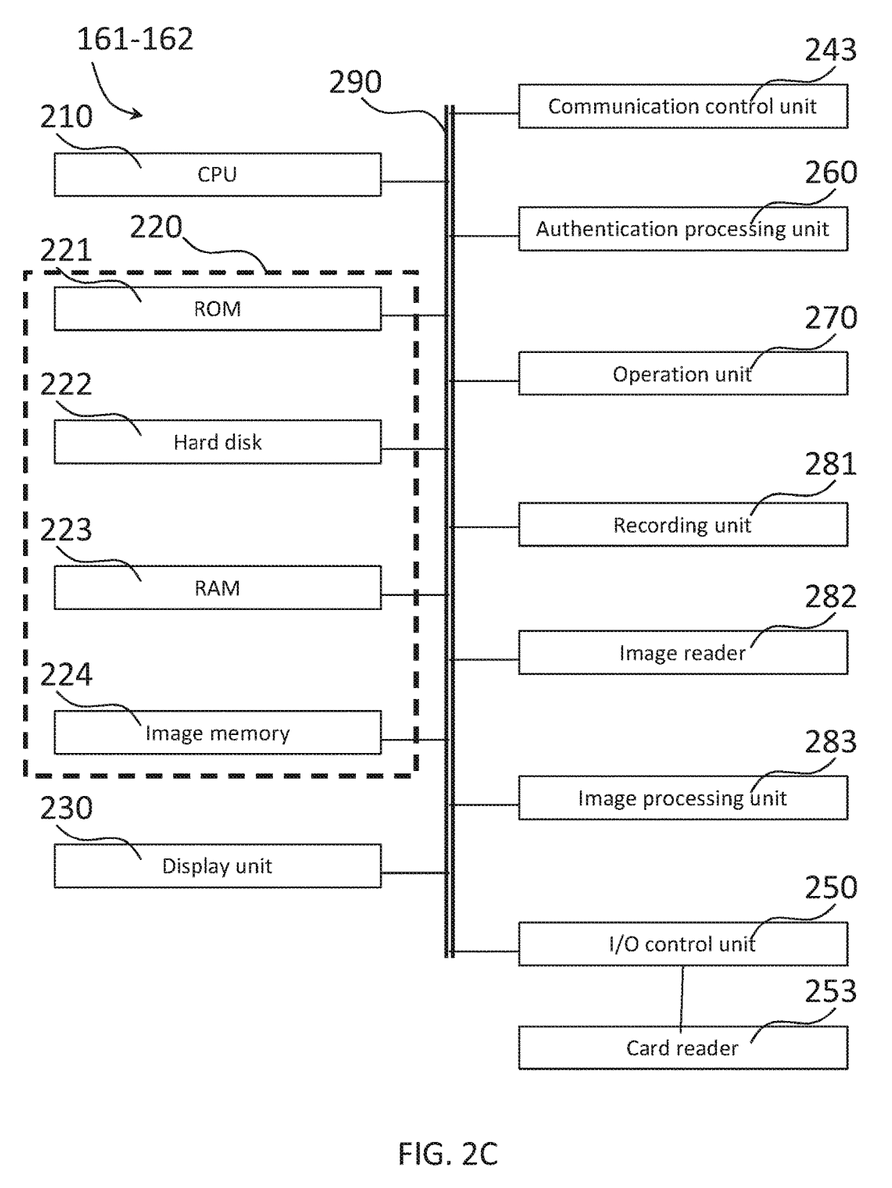

FIG. 2C shows the hardware configuration of a printer 161-162. The term "printer" is used to refer to any multi-function peripheral device (MFP), which typically is configured to perform a variety of functions including printing, scanning and communication. The printer 161-162 includes features that perform substantially the same functions as the features of the client 110, as indicated by the corresponding reference numerals. The printers 161-162 each further include various hardware components which are dedicated to functionality as an MFP, such as a recording unit 281, an image reader 282, and an image processing unit 283.

The display unit 230 is a touch-screen liquid crystal display (LCD) provided on the printer 161-162 to allow a user to make selections and view information on the printer 161-162, such as requesting the printing of a print job stored on a print server 131-133. The communication control unit 243 is provided to allow the printer 161-162 to communicate over the LAN with the print server 131. The printer 161-162 includes an authentication processing unit 260 and a card reader 253 connected to the I/O control unit 250. The authentication processing unit 260 is provided to authenticate user details received from the card reader 253. Data from the card reader 253 is received at the authentication processing unit 260 via the I/O control unit 253. The authentication processing unit 260 may be implemented by software run using the CPU 210 and RAM 230 rather than as a separate hardware component. The operation unit 270 is a keypad and other buttons that allow a user to enter settings and other information to the printer 161-162. The recording unit 281 represents parts of the printer 161-162 dedicated to printing. The recording unit 281 functions to print image data onto a recording medium and output the recording medium for collection by the user. The memory 220 of the printer 161-162 includes an image memory 224, which is a memory provided for storage of image data obtained during scanning by the image reader 282 or printing by the recording unit 281. The image-processing unit 283 represents various application specific integrated circuits (ASIC) provided in the printer 161-162 to increase the speed of certain image processing operations, such as conversion of scanned RGB data into CMYK data during a copy operation.

The printer 161-162 runs an operating system, such as the Multifunctional Embedded Application Platform (MEAP) operating system provided on multifunction devices sold by Canon (registered trademark).

Figure 3A:
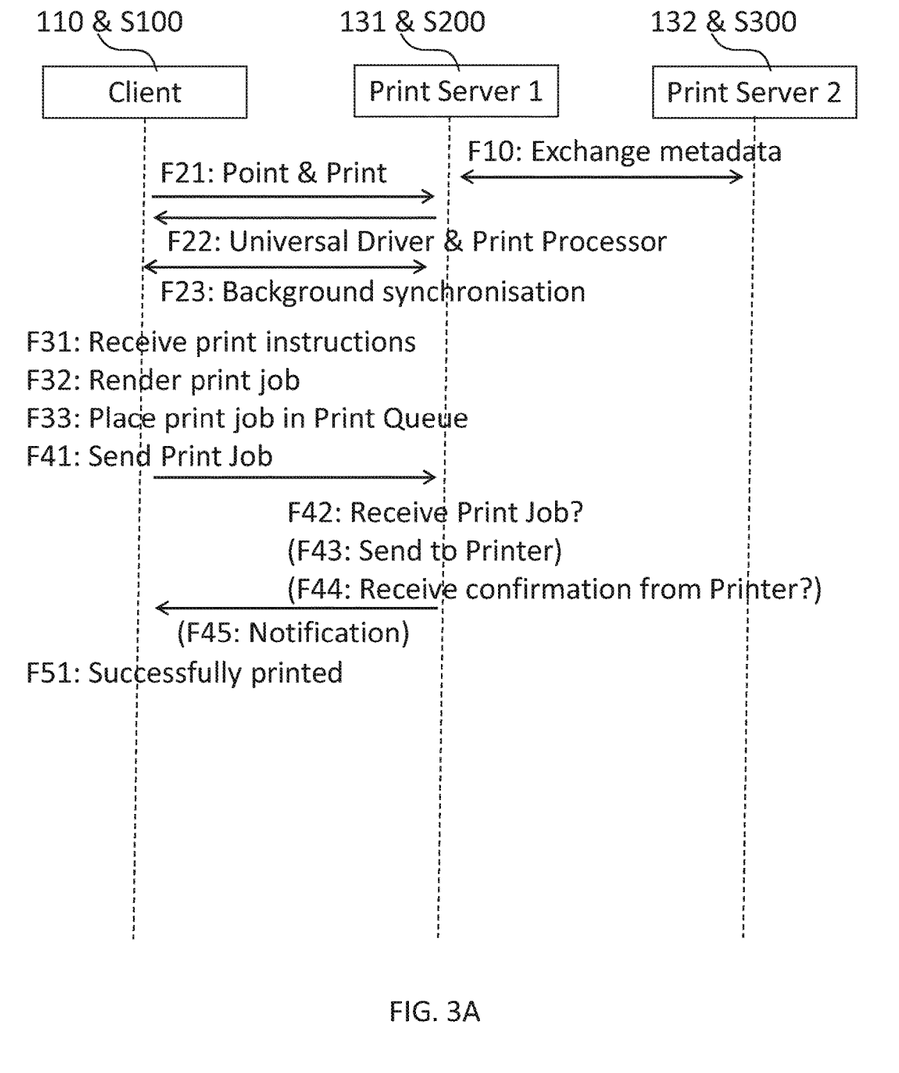
FIGS. 3A-3B provide workflows showing how the client computer interacts with a first print server and a second print server, where FIG. 3A details the situation in which the print job is successfully printed via the first print server, and where FIG. 3B details the situation for which there is a failure of the first print server.
Figure 3B:
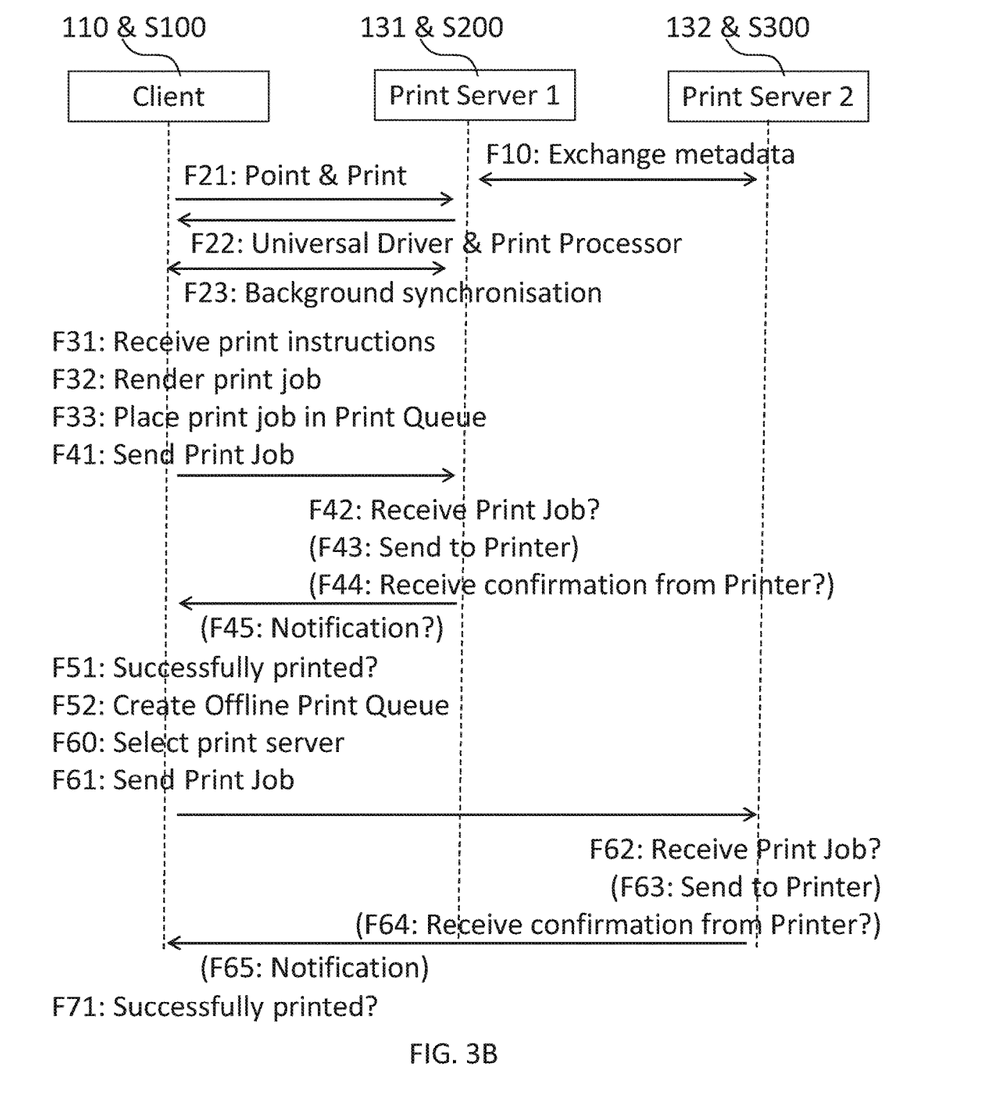

FIGS. 3A-3B provide workflows of the operation implemented by printing system 100.

FIG. 3A illustrates a workflow in which the print job is successfully printed using the first print server 131.

The print servers 131-133 are configured to exchange metadata with one another F10. More particularly, the print servers 131-133 communicate with one another via the first network 121 or the second network 122 to share information, including their IP address and metadata about jobs stored on those servers. Furthermore, the print servers 131-133 can establish whether the other printer servers 131-133 are currently available to the client 110.

The client 110 is configured to use the first print server 131. As described previously, Point and Print refers to the capability of installing a connection to a remote printer 161-162 without the user being required to provide any installation media. Instead, all necessary files and configuration information are automatically downloaded from the selected print server 131 to the client 110.

A Point and Print request is transmitted F21 from the client 110 to the first print server 131. In response, the first printer 131 sends F22 to the client 110 copies of the universal printer driver 141a and the print processor 142a. Subsequent to installation of the universal printer driver, background synchronisation F23 of the client 110 and the print server 131 occurs. During this synchronisation the IP addresses of the other printer servers 132 and 133 is communicated from the first print server 131 to the universal printer driver. Following synchronisation the universal printer driver is configured to print to the first print server 131 and in parallel stores IP addresses for the other available printer servers 132 and 133 on the network 121. During normal operation of the client 110, printing can be achieved by using the software stored locally in the memory 111 of the client 110 including the universal printer driver 141b and print processor 142b.

A printing operation will now be described. A user instructs the client 110 that a print job is to be printed F31. The client 110 uses the universal printer driver 142b to render the print job F32. Rendering the print job locally by the client 110 means that it is not necessary for the print job to be rendered by the print server 131. The client 110 creates F33 a print queue 151, which stores a list of jobs that are to be printed.

The print job created by the universal printer driver 141b is stored in the created print queue 151. The print job is sent F41 to the first print server 131 by the Windows spooler. The Windows print system transfers the print job data via remote desktop protocol (RDP), which provides the basis for the sharing of the print queue 151 via Point and Print.

During normal operation, the print job will be received F42 by the first print server 131, and subsequently, the first print server 131 will issue instructions F43 to a printer selected from the plurality of printers 161-162. Once printing is completed, confirmation is received F44 by the first print server 131, from the selected printer 161. A notification is sent F45 from the first print server 131 to the client 110.

The client 110 performs an assessment F51 of whether the print job was successfully completed. The assessment during normal operation is achieved by determining the receipt F45 from the first print server 131 of the notification which confirms that the print job has been successfully printed. Consequently, the client 110 updates the print queue 151 by removing the print job.

As an alternative, rather than waiting for the receipt F45 of the notification which confirms that the print job has been successfully printed, the print queue 151 can be updated when the print job has been successfully spooled to the first print server 131. This is because it is more important that the print job is spooled to the first print server 131, rather than the print job being printed by a physical printer 161-162. The responsibility of the client 110 ends once the print job has been fully sent (or spooled) to the first print server 131. Thus, it is not necessary for the method to include steps F43-F45.

FIG. 3B illustrates a workflow for which there is a failure of the first print server 131, with the print job being successfully printed via the second print server 132.

At step F10, the print servers exchange metadata as previously described in connection with FIG. 3A. The universal printer driver are installed on the client 110 using 'Point and Print' as previously described in steps F21 and F22. At step F23, once the universal printer driver is installed on the client 110, the driver synchronises with the first print server in order to obtain IP addresses of the other print servers on the network. These steps have been previously described in connection with FIG. 3A.

A printing operation will now be described. A user instructs the client 110 that a print job is to be printed F31. The client 110 uses the universal printer driver 142b to render the print job F32. The client 110 creates F33 a print queue 151, which stores a list of jobs that are to be printed.

The print job created by the universal printer driver 141b is stored in the created print queue 151. The Windows spooler attempts to transmit the print job to the first print server 131. However, in this example, the first print server is not online. Accordingly, it is determined F51 by the print processor that is monitoring the spooling that the print job was not successfully transmitted. A timeout error is identified by the client 110 if it is determined F51 that no notification is received during a predetermined time period. In the event that a failure occurs with the printing of the print job, it is desirable to make alternative arrangements, so that the print job is executed. In the event of a timeout error being identified by the client 110, the method proceeds to step F52.

As an alternative, rather than waiting for a timeout error to be determined by the client 110, it can be identified F51 that there has been an error if an error notification is received by the client 110 from the first print server 131. This is possible in the situation that the first print server 131 is online, although the first print server 131 is not capable of processing print jobs. A failure of the first print server 131 to send the print job to a printer 161-162 can occur for the situation in which the first print server 131 is not running an integrated print and scan management solution. An example of an integrated print and scan management solution is uniFLOW (a registered trademark of NT-ware Systemprogrammierung GmbH). In the event of an error notification being received by the client 110, the method proceeds to step S152. A version of uniflow embodying the invention was not available to the public at the relevant earliest date of this disclosure.

The print processor 142b creates F52 an offline print queue 152, which is achieved by duplicating the contents of the print queue 151. The offline print queue 152 then transmits the duplicated print job to a different server 132-133 under control of the printer driver 141b.

The IP address of the different print server 132-133 is identified from the universal printer driver 141b, which obtained the IP address in synchronisation step F23. The IP addresses are stored in the universal printer driver 141b and a first address is selected F60 as the destination to send the print job from the offline print queue 152. In this example, the IP address is that of the second print server 132.

The print job is sent F61 to the second print server 132 by the client 110 using the printer driver 141b to transmit instructions according to the offline print queue 152. The sending of the print job F61 from the client 110 to the second print server 132 is achieved using internet printing protocol (IPP).

In the case of IPP printing, the universal printer driver 141b does not write to the Windows print system according to RDP printing. Instead, the universal printer driver 141b directly initiates IPP connections to the second print server 132, bypassing the Windows printing system. A positive result is sent back to the print processor, such that the printing of the print job is treated as successful.

The print processor 142b is responsible for duplicating the print queue 151, thus duplicating the print job to that print queue 151, which creates the offline print queue 152. The print job duplicate of the offline print queue 152 is flagged for IPP printing. This flag is read by the universal printer driver 141b of the duplicate print job, which will then issue the IPP printing process.

The universal printer driver 141b and the print processor 142b software which were obtained from the first print server 131 are compatible with the second print server 132, and so the client 110 can print via the second print server 132 without the need to download any additional software.

If the print job is received F62 by the second print server 132 from the client 110, the second print server 132 will issue instructions F63 to a printer selected from the plurality of printers 161-162. If printing is successfully completed, confirmation is sent from the selected printer 161 to the second print server 132. A notification is sent F64 from the second print server 132 to the client 110.

As an alternative, rather than waiting for the receipt F65 of the notification which confirms that the print job has been successfully printed, the print queue 151 can be updated when the print job has been successfully spooled to the second print server 132. This is because it is more important that the print job is spooled to the second print server 132, rather than the print job being printed by a physical printer 161-162. The responsibility of the client 110 ends once the print job has been fully sent (or spooled) to the second print server 132. Thus, it is not necessary for the method to include steps F63-F65.

The client 110 performs an assessment of whether the print job was successfully completed F71. If it is determined that notification F64 confirms that the print job has been successful, the client 110 updates the print queue 151 and the offline print queue 152 to remove the print job. On the other hand, if it is determined that the print job was not successfully completed F71, the client 110 instead instructs the third print server 133 to complete the print job, since it continues to be listed by the offline print queue 152.

The client 110 can be connected to a plurality of print servers 131-133, each of which has a different IP address. In the event of the failure of one of the print servers, there is a problem that the print queue of the client 110 is only configured to send print jobs to the first print server 131. The present arrangement allows the client to print to any of the print servers 131-133, because the universal printer driver 141b includes all of the IP addresses associated with the print servers 131-133, and the print processor 142b is able to re-route the print job to an appropriate print server by duplicating the print queue.

Accordingly, since there has been a failure of the first print server 131, the client 110 is used to instruct a replacement print server 132-133. The replacement print server 132-133 is selected by the client 110 from the list of available print servers 132-133 that are stored by the universal printer driver 141b. The client 110 can be configured to determine how to choose between the available print servers 132-133. FIG. 3B shows the situation in which the second print server 132 has been selected to implement the print jobs that are stored by the offline print queue 152 that has been created F52 by the client 110.

Figure 4A:
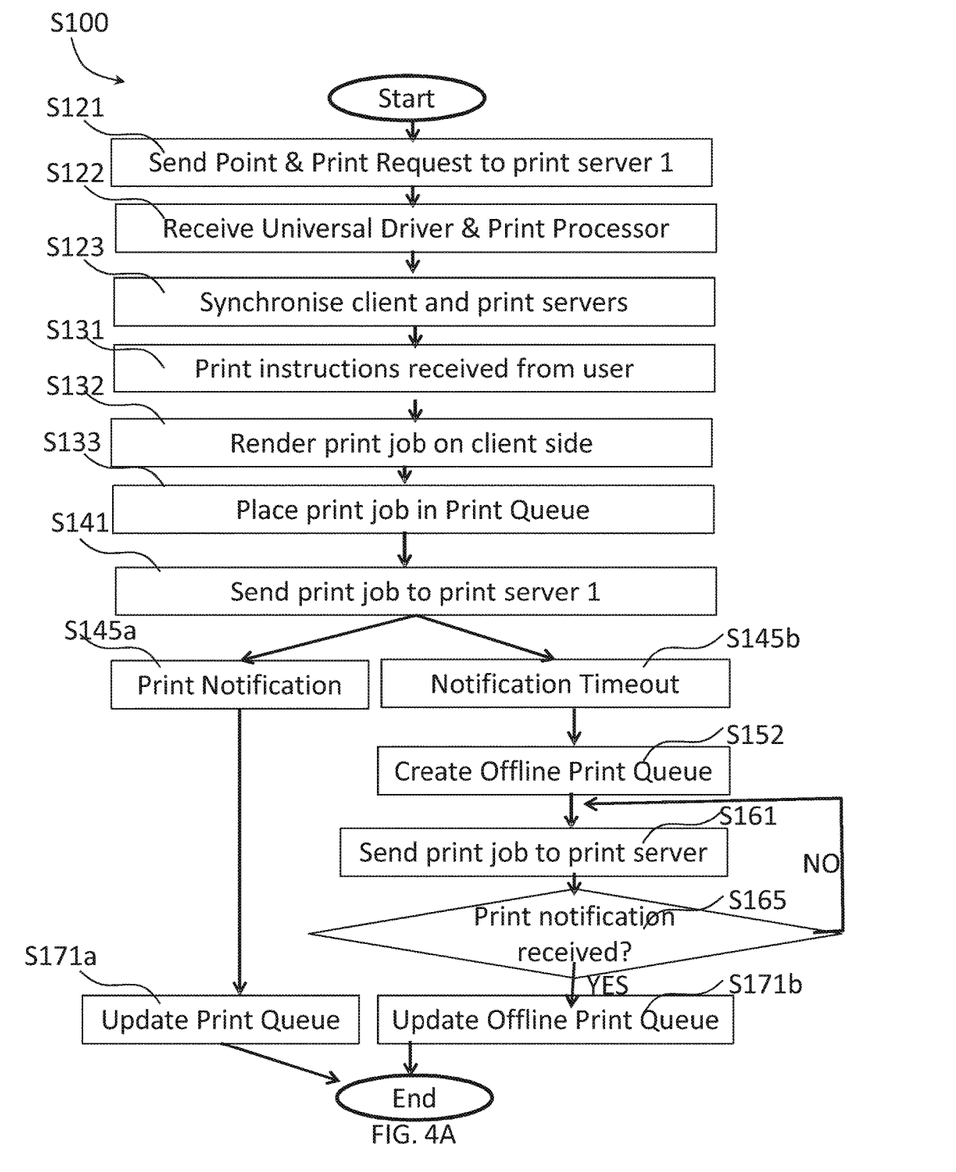
FIG. 4A is a flowchart of processes performed on the client computer.
Figure 4B:
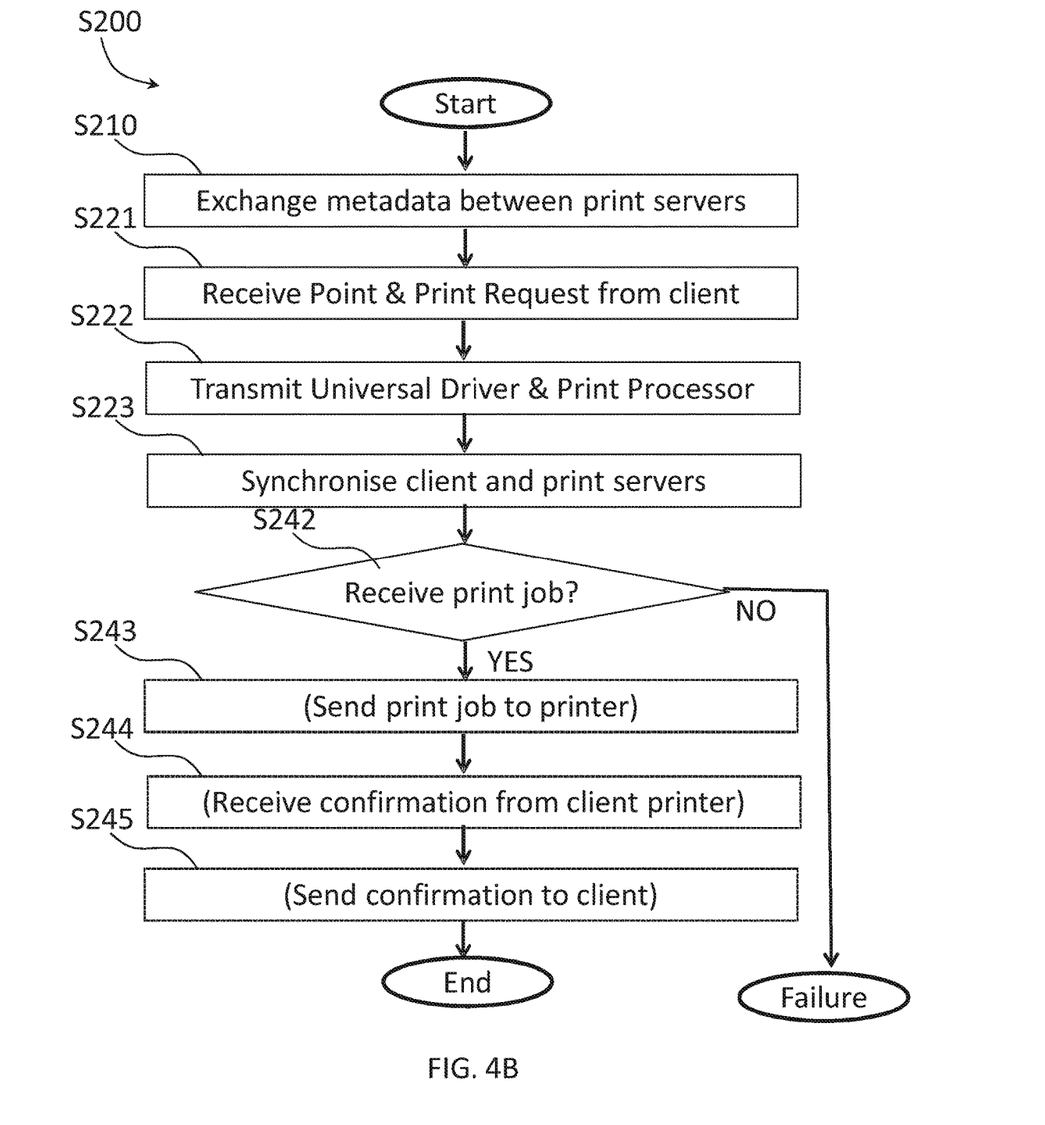
FIG. 4B is a flowchart of processes performed on the first print server.
Figure 4C:
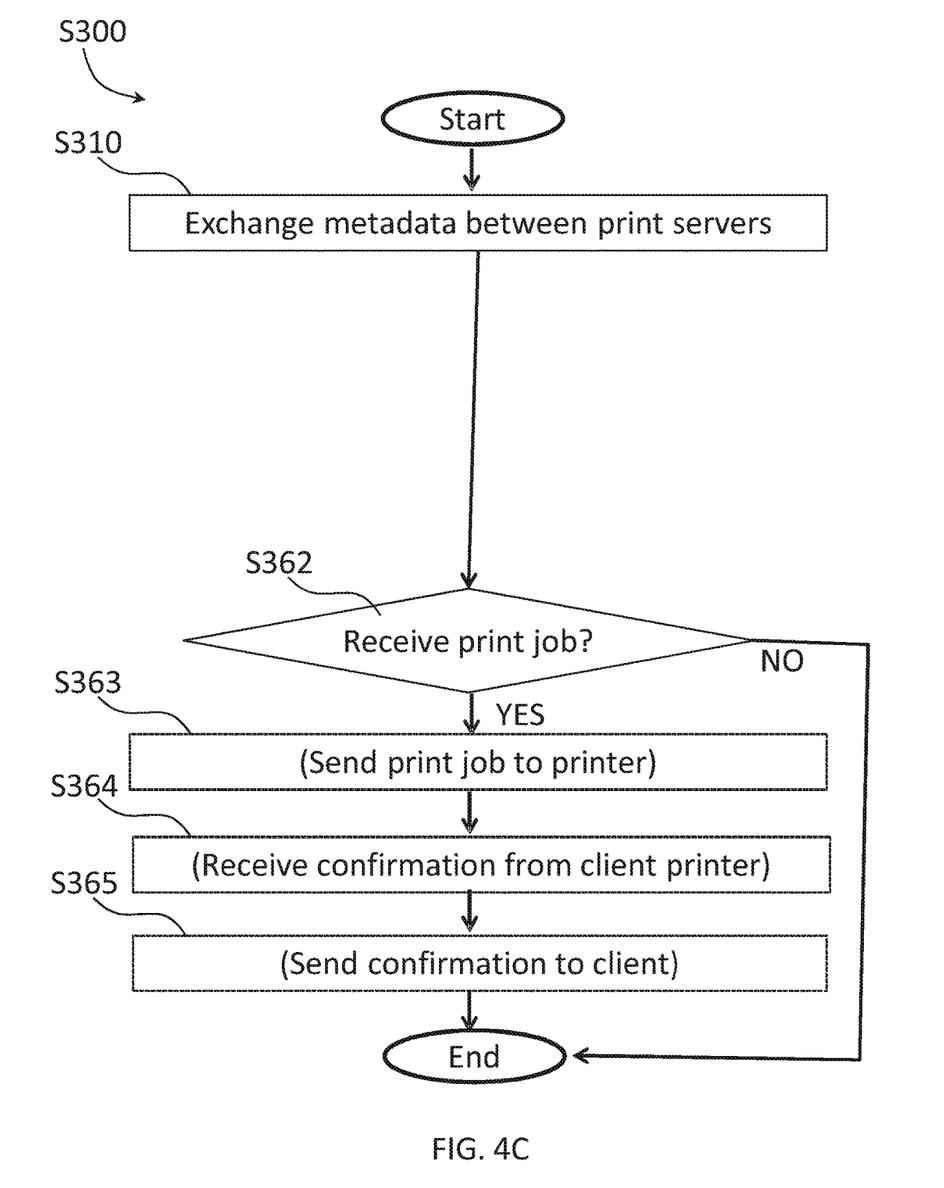
FIG. 4C is a flowchart of processes performed on the second print server.

FIGS. 4A-C provide flowcharts showing processes performed on the client and the printer servers. The reference numerals used in the workflows illustrated by FIGS. 3A-3B correspond to the last 2 digits of the reference numeral used in FIGS. 4A-C.

FIG. 4A shows method steps that are performed by the client 110.

In step S121, a Point and Print request is sent to the first print server 131. In step S122, the client 110 awaits receipt from the first print server 131 of copies of the universal printer driver 141b and the print processor 142b in a driver package. These software components are then installed on the client computer. In step S123, the client 110 and print servers 131-133 are synchronized, such that the universal printer driver 141b acquires IP addresses of the print servers on the network.

In step S131, print instructions are received from the user, which are submitted to the I/O control unit 250 of the client 110 using input devices 251-252. In step S132, the universal printer driver 141b renders the print job for printing. In step S133, the print processor 142b monitors the print job in the print queue 161.

In step S141, the print job is sent to the first print server 131.

If it is determined that the print job was successfully implemented, in step S145a, a print notification is received. The print queue 151 is updated S171a, and subsequently the process ends.

If it is determined that the print job was not successfully implemented, in step S145b, the print processor 142b identifies that the print job was not successfully printed if no notification is received within a predetermined period of time. In step S152, an offline print queue 152 is created by the print processor duplicating the print queue 151, and the print queue 151 is updated to remove the print job that has been duplicated to the offline print queue 151. Thus, the print job is to be completed by the second print server 132, and so the print queue 151 is updated so that the print job isn't sent to the first print server 131 when the first print server 131 comes back online.

In step S161, a replacement print server, such as the second print server 132 or the third print server 133, is selected F60 by the printer driver 141b. Instructions are then sent F61 by the printer driver 141b to the replacement print server 132-133 that has been selected. The replacement print server 132-133 is selected based upon the synchronisation information that was received in step S123.

In step S165, an assessment is made of whether the print job was successfully printed. If the print job was successfully printed, then the process moves to step S171b. If the print job was not successfully printed, then an alternative print server is selected F60 by returning to step S161. In step S171b, the offline print queue 152 is updated, thus removing the print job from the offline print queue 152.

FIG. 4B shows method steps that are performed by the first print server 131.

In step S210, metadata is exchanged between the print servers 131-133. In step S221, the first print server 131 receives the Point and Print request from the client 110. In step S222, the universal printer driver 141a and the print processor 142a are transmitted in a software package from the first print server 131 to the client 110. In step S223, information is synchronized with the universal printer driver 142b to convey IP addresses of printer servers 131-133.

In step S242, an assessment is made of whether a print job has been received from the client 110.

If a print job is not received by the first print server 131 (NO in step S242), then there has been a failure. As a consequence, the print processor 142b of the client 110 will determine that there has been a timeout error. As an alternative to the timeout error being determined by the client 110, instead it is possible that an error notification could be transmitted by the first print server 131 to the client 110, in the event that the first print server 131 determines that it is not capable of sending the print job to the printer 161-162.

If the print job is received by the first print server 131 (YES in step S242), then the print job is sent S243 to the printer 161-162. Note that this step is not required, because it is not relevant whether printing has actually occurred. Instead, an assessment is made of whether spooling of the print job has occurred from the client 110 to the first print server 131. For example, the print job may be stored on the first print server 131 for later printing.

In step S244, a confirmation notification is received by the first print server 131 that was transmitted by the printer 161-162 to confirm that printing was successful. In step S245, in response to the first print server 131 receiving confirmation from the printer 161-162, a print notification is sent to the client 110. Since it is more important that the print job is spooled to the first print server 131, rather than the print job being printed by a physical printer 161-162, it is not necessary for the method to include steps S243-S245.

FIG. 4C shows method steps that are performed by the second print server 132. In step S310, metadata is exchanged between the print servers 131-133.

In step S362, an assessment is made of whether a print job has been received from the client 110. If a print job is not received by the second print server 132 (NO in step S362), then no further action is taken. If the print job is received by the second print server 132 (YES in step S362), then the print job is sent S363 to the printer 161-162.

Note that the significant event under consideration is the transmission of the print job from the client 110 to the second print server 132, rather than the successful transmission of the print job from the second print server 132 to the printer 161-162.

In step S364, a confirmation notification is received by the second print server 132 that was transmitted by the printer 161-162 to confirm that printing was successful. In step S365, in response to the second print server 132 receiving confirmation from the printer 161-162, a print notification is sent to the client 110. Since it is more important that the print job is spooled to the second print server 132, rather than the print job being printed by a physical printer 161-162, it is not necessary for the method to include steps S363-S365. For example, the print job may be stored on the second print server 132 for later printing.

The second print server 132 serves as a backup in the event that there is a failure of the first print server 131. Furthermore, the print job is executed by the client 110 without having to install any software from the second print server 132, because compatible software was previously installed from the first print server 131.

The above examples can also be realised by a computer of a system or apparatus (or devices such as a CPU or MPU) that reads out and executes a program recorded on a memory device to perform the functions of the above-described examples, and by a method, the steps of which are performed by a computer of a system or apparatus by, for example, reading out and executing a program recorded on a memory device to perform the functions of the above-described examples. For this purpose, the program is provided to the computer for example via a network or from a recording medium of various types serving as the memory device (e.g., a computer-readable medium such as a non-transitory computer-readable medium).

While the present invention has been described with reference to embodiments, it is to be understood that the invention is not limited to the disclosed embodiments. The present invention can be implemented in various forms without departing from the principal features of the present invention. The scope of the following claims is to be accorded the broadest interpretation so as to encompass all such modifications and equivalent structures and functions.

The invention claimed is:

1. A non-transitory computer-readable storage medium storing a printer driver package comprising a printer driver and a print processor, wherein:
  the printer driver is configured, when installed on a client computer:
    to receive and store print server information identifying a plurality of print servers that the client computer can use to send a print job to a printer; and
    to render the print job into a page description language usable by a printer for printing; and
  the print processor is configured:
    to create a first print queue for sending the rendered print job from the client computer to a first print server of the plurality of print servers and to add the rendered print job to the created first print queue; and
    to monitor sending of the rendered print job in the first print queue, to the first print server, wherein, after receiving the rendered print job, the first print server sends the rendered print job to the printer for printing;
  wherein in a case where the print processor detects that the sending of the rendered print job from the client computer to the first print server is not successful:
    the print processor is configured to create a second print queue and to add a duplicate of the print job to the second print queue by duplicating the rendered print job in the first print queue;
    the printer driver is configured to select a second print server from among the plurality of print servers identified in the print server information stored by the printer driver; and
    the printer driver is configured to send the duplicate print job in the second print queue from the client computer to the second print server, and
  wherein in a case where the print processor detects that the sending of the rendered print job from the client computer to the first print server is successful:
    the print processor is configured to not create the second print queue.

2. The non-transitory computer-readable storage medium storing the printer driver package according to claim 1, wherein in a case where the print processor detects that the sending of the duplicate print job from the client computer to the second print server is not successful:
  the printer driver is configured to select a third print server from among the plurality of print servers identified in the print server information stored by the printer driver; and
  the printer driver is configured to send the duplicate print job in the second print queue from the client computer to the third print server.

3. The non-transitory computer-readable storage medium storing the printer driver package according to claim 1, wherein:
  the print processor is configured, in a case where the print processor detects that the sending of the rendered print job from the client computer to the first print server is successful:
    to update the first queue by removing the rendered print job, after a confirmation notification is received; and
  the print processor is configured, in a case where the print processor detects that the sending of the rendered print job from the client computer to the first print server is not successful:
    to update the first print queue by removing the rendered print job after creating the second print queue; and
    to update the second print queue by removing the duplicate print job, after a confirmation notification is received.

4. The non-transitory computer-readable storage medium storing the printer driver package according to claim 1, wherein the printer driver is configured to receive and store the print server information by receiving data on the print servers that are available to the client computer from at least one of the print servers.

5. A client computer comprising a non-transitory computer-readable storage medium storing a printer driver package comprising a printer driver and a print processor, wherein:
  the printer driver is configured, when installed on a client computer:
    to receive and store print server information identifying a plurality of print servers that the client computer can use to send a print job to a printer; and
    to render the print job into a page description language usable by a printer for printing; and
  the print processor is configured:
    to create a first print queue for sending the rendered print job from the client computer to a first print server of the plurality of print servers and to add the rendered print job to the created first print queue; and
    to monitor sending of the rendered print job in the first print queue, to the first print server, wherein, after receiving the rendered print job, the first print server sends the rendered print job to the printer for printing;
  wherein in a case where the print processor detects that the sending of the rendered print job from the client computer to the first print server is not successful:
    the print processor is configured to create a second print queue and to add a duplicate of the print job to the second print queue by duplicating the rendered print job in the first print queue;

the printer driver is configured to select a second print server from among the plurality of print servers identified in the print server information stored by the printer driver; and the printer driver is configured to send the duplicate print job in the second print queue from the client computer to the second print server, and wherein in a case where the print processor detects that the sending of the rendered print job from the client computer to the first print server is successful:

the print processor is configured to not create the second print queue.

6. The client computer according to claim 5, configured to automatically retrieve the printer driver package from the first print server.

7. The client computer according to claim 6, wherein the automatic retrieval of the printer driver package is performed using point and print.

8. A print system comprising a client computer and a plurality of print servers, wherein the client computer comprises a non-transitory computer-readable storage medium storing a printer driver package comprising a printer driver and a print processor, wherein:

the printer driver is configured, when installed on a client computer:

to receive and store print server information identifying a plurality of print servers that the client computer can use to send a print job to a printer; and to render the print job into a page description language usable by a printer for printing; and the print processor is configured:

to create a first print queue for sending the rendered print job from the client computer to a first print server of the plurality of print servers and to add the rendered print job to the created first print queue; and to monitor sending of the rendered print job in the first print queue, to the first print server, wherein, after receiving the rendered print job, the first print server sends the rendered print job to the printer for printing;

wherein in a case where the print processor detects that the sending of the rendered print job from the client computer to the first print server is not successful:

the print processor is configured to create a second print queue and to add a duplicate of the print job to the second print queue by duplicating the rendered print job in the first print queue;

the printer driver is configured to select a second print server from among the plurality of print servers identified in the print server information stored by the printer driver; and the printer driver is configured to send the duplicate print job in the second print queue from the client computer to the second print server, and wherein in a case where the print processor detects that the sending of the rendered print job from the client computer to the first print server is successful:

the print processor is configured to not create the second print queue.

9. A print method for providing resilient transmission of a print job from a client computer to a print server, the print method comprising:

downloading and installing a printer driver package including a printer driver and a print processor on a client computer:

the installed printer driver receiving and storing print server information identifying a plurality of print servers that the client computer can use to send a print job to a printer;

the printer driver rendering the print job into a page description language usable by a printer for printing; and the print processor creating a first print queue for sending the rendered print job from the client computer to a first print server of the plurality of print servers, and adding the rendered print job to the created first print queue; and the print processor monitoring the sending of the rendered print job in the first print queue, to the first print server, wherein, after receiving the rendered print job, the first print server sends the rendered print job to the printer for printing;

wherein in a case where the print processor detects in the monitoring step that the sending of the rendered print job from the client computer to the first print server is not successful:

the print processor creates a second print queue and adds a duplicate of the print job to the second print queue by duplicating the rendered print job in the first print queue;

the printer driver selects a second print server from among the plurality of print servers identified in the print server information stored by the printer driver; and the printer driver sends the duplicate print job in the second print queue from the client computer to the second print server, and wherein in a case where the print processor detects that the sending of the rendered print job from the client computer to the first print server is successful:

the print processor is configured to not create the second print queue.

* * * * *